July 18, 1961 P. H. ARNOLD ET AL 2,993,095

PRIVATE BRANCH EXCHANGE TELEPHONE SYSTEM
INVOLVING A CORDLESS TYPE SWITCHBOARD

Filed April 10, 1959 10 Sheets-Sheet 1

INVENTORS P. H. ARNOLD
A. B. DESNOES
T. STEARN
G. D. STEWART
E. R. WOOD

BY G. F. Kane

ATTORNEY

July 18, 1961 P. H. ARNOLD ET AL 2,993,095

PRIVATE BRANCH EXCHANGE TELEPHONE SYSTEM
INVOLVING A CORDLESS TYPE SWITCHBOARD

Filed April 10, 1959 10 Sheets-Sheet 2

INVENTORS P. H. ARNOLD
A. B. DESNOES
T. STEARN
G. D. STEWART
E. R. WOOD

BY G. F. Kane
ATTORNEY

July 18, 1961 P. H. ARNOLD ET AL 2,993,095

PRIVATE BRANCH EXCHANGE TELEPHONE SYSTEM INVOLVING A CORDLESS TYPE SWITCHBOARD

Filed April 10, 1959 10 Sheets-Sheet 3

INVENTORS P. H. ARNOLD
A. B. DESNOES
T. STEARN
G. D. STEWART
E. R. WOOD

BY A. F. Kane

ATTORNEY

INVENTORS P. H. ARNOLD
A. B. DESNOES
T. STEARN
G. D. STEWART
E. R. WOOD
BY G. F. Kane
ATTORNEY INVENTORS P. H. ARNOLD
A. B. DESNOES
T. STEARN
G. D. STEWART
E. R. WOOD
BY G. F. Kane
ATTORNEY INVENTORS P.H. ARNOLD
A.B. DESNOES
T. STEARN
G.D. STEWART
E.R. WOOD
BY G. F. Kane
ATTORNEY INVENTORS P.H. ARNOLD
A.B. DESNOES
T. STEARN
G.D. STEWART
E.R. WOOD
BY G. F. Kane
ATTORNEY July 18, 1961 P. H. ARNOLD ET AL 2,993,095

PRIVATE BRANCH EXCHANGE TELEPHONE SYSTEM
INVOLVING A CORDLESS TYPE SWITCHBOARD

Filed April 10, 1959 10 Sheets-Sheet 8

INVENTORS P. H. ARNOLD
A. B. DESNOES
T. STEARN
G. D. STEWART
E. R. WOOD

BY G. F. Kane
ATTORNEY

PRIVATE BRANCH EXCHANGE TELEPHONE SYSTEM
INVOLVING A CORDLESS TYPE SWITCHBOARD

Filed April 10, 1959 10 Sheets-Sheet 9

INVENTORS P.H. ARNOLD
A.B. DESNOES
T. STEARN
G.D. STEWART
E.R. WOOD
BY A. F. Kane
ATTORNEY July 18, 1961 P. H. ARNOLD ET AL 2,993,095

PRIVATE BRANCH EXCHANGE TELEPHONE SYSTEM
INVOLVING A CORDLESS TYPE SWITCHBOARD

Filed April 10, 1959 10 Sheets-Sheet 10

INVENTORS P.H. ARNOLD
A.B. DESNOES
T. STEARN
G.D. STEWART
E.R. WOOD

BY A. F. Kane
ATTORNEY 2,993,095

PRIVATE BRANCH EXCHANGE TELEPHONE SYSTEM INVOLVING A CORDLESS TYPE SWITCHBOARD

Philip H. Arnold, Rahway, N.J., and Arnold B. Desnoes, Massapequa, Theodore Stearn, Flushing, G. Douglass Stewart, Yonkers, and Edson R. Wood, Hastings on Hudson, N.Y., assignors to American Telephone and Telegraph Company, New York, N.Y., a corporation of New York Filed Apr. 10, 1959, Ser. No. 805,585
6 Claims. (Cl. 179—27)

This invention relates to telephone systems and particularly to private branch exchange systems involving relatively small capacity switchboards.

In line with the current trend of industry toward mechanization and modernization there has evolved a demand for a compact telephone switchboard of the console type which would occupy a minimum of space; which would lend itself to simplicity of operation; which would require a minimum of monitoring on the part of the attendant without restricting its traffic load capacity; and which would provide faster and more accurate telephone service than is afforded by cord type switchboards having comparable functional characteristics.

It is the object of this invention to provide a telephone switchboard which meets the above-indicated requirements and which otherwise reduces to a minimum the human element required in the servicing of trunk and extension line calls at a private branch exchange switchboard.

This object is attained in accordance with a feature of the invention by utilizing push-button control of automatic stepping switches at a private branch exchange in effecting the completion of telephone connections involving extension stations, central office trunk circuits and tie lines.

Another feature of the invention resides in the use of illuminated push-buttons at the switchboard for identifying various trunk circuits, tie lines and extension stations, and in combining the illuminating means with control means for distinctively varying the visual characteristics of the illuminating means in accordance with various stages through which a call progresses. More specifically, and in the case of a trunk connection, the push-button is normally unlighted to indicate the idle condition of the circuit to which it is specifically allocated; is caused to flash at the rate of 60 times per minute to indicate the receipt of a call on the associated circuit; is caused to be lighted steadily when the attendant answers the call; is caused to flash at the rate of 120 times per minute when the attendant operates an extension key in the process of extending the trunk connection to an extension station, thus indicating to the attendant that the bell at the called extension station is being rung automatically by machine ringing; and to cause it to be lighted steadily when the called station answers. In such a connection the extension station key button, incident to its operation by the attendant, is lighted in a steady manner to indicate the busy condition of the extension, the normal unlighted condition of the key button being indicative of the idle condition of the corresponding extension.

A further feature of the invention contemplates the use of nonlocking illuminated key buttons which render it possible for an attendant to service calls at the switchboard simply by the momentary operation of the nonlocking keys. In accordance with this feature it is not necessary for the attendant to remain on a connection until the extension station answers. She may hang up her handset as soon as she momentarily depresses an extension button or she may press another key to handle another call. Upon completion of the call the extension station hangs up the telephone, the connection is automatically released and the involved trunk and station lamps are extinguished. This feature eliminates the need for an attendant to constantly or periodically monitor connections completed at the switchboard and thus insures more effective use of the attendant's time.

A further feature of the invention involves the use of a pair of station finder switches both of which serve the same group of extension stations under the control of individual push-button keys allocated to the stations, in such a manner that a connection to an extension is completed by way of one of said switches when the corresponding extension key button is actuated in the process of extending a connection involving a central office trunk circuit, and by way of the other switch when the same extension key button is actuated at the switchboard in the process of originating a call to the extension station.

These and other features of the invention will be better understood from the detailed description to be made hereinafter and when read with reference to the accompanying drawings in which.

Figure 1:
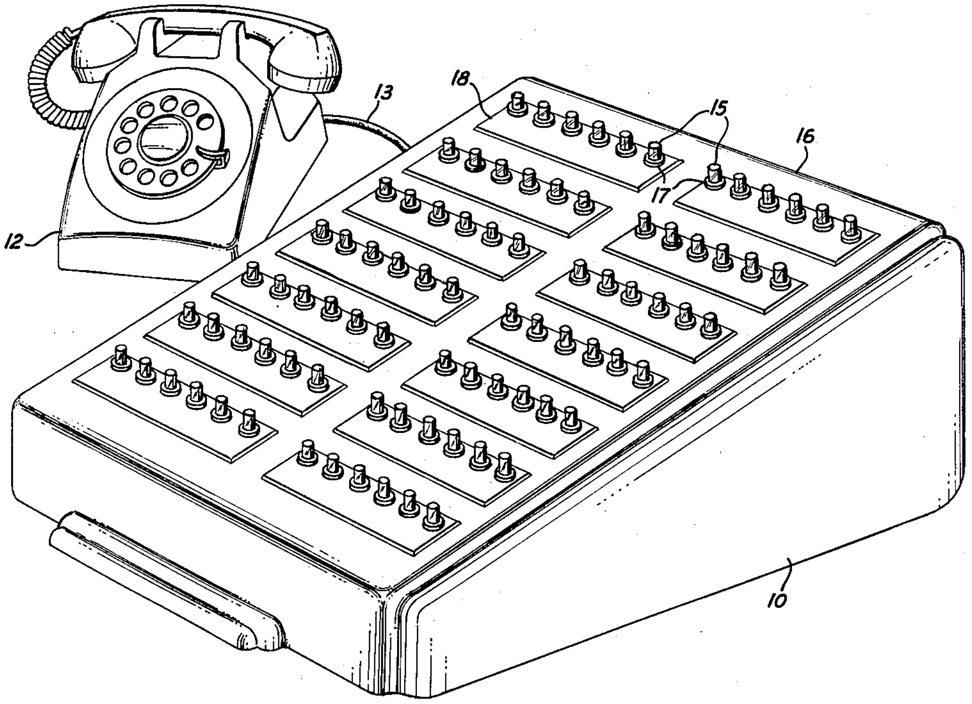
FIG. 1 illustrates a preferred overall design of console type switchboard involving features of the invention.
Figure 3:
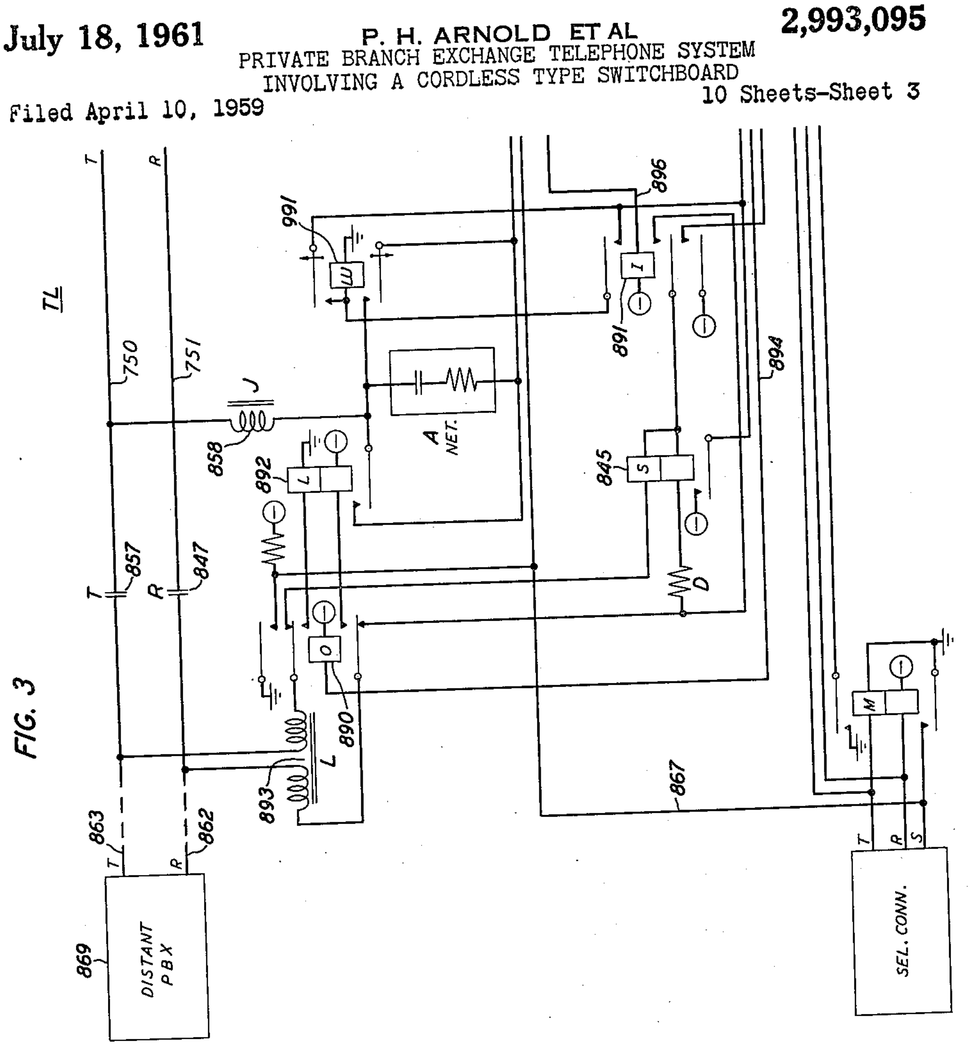
Figure 4:
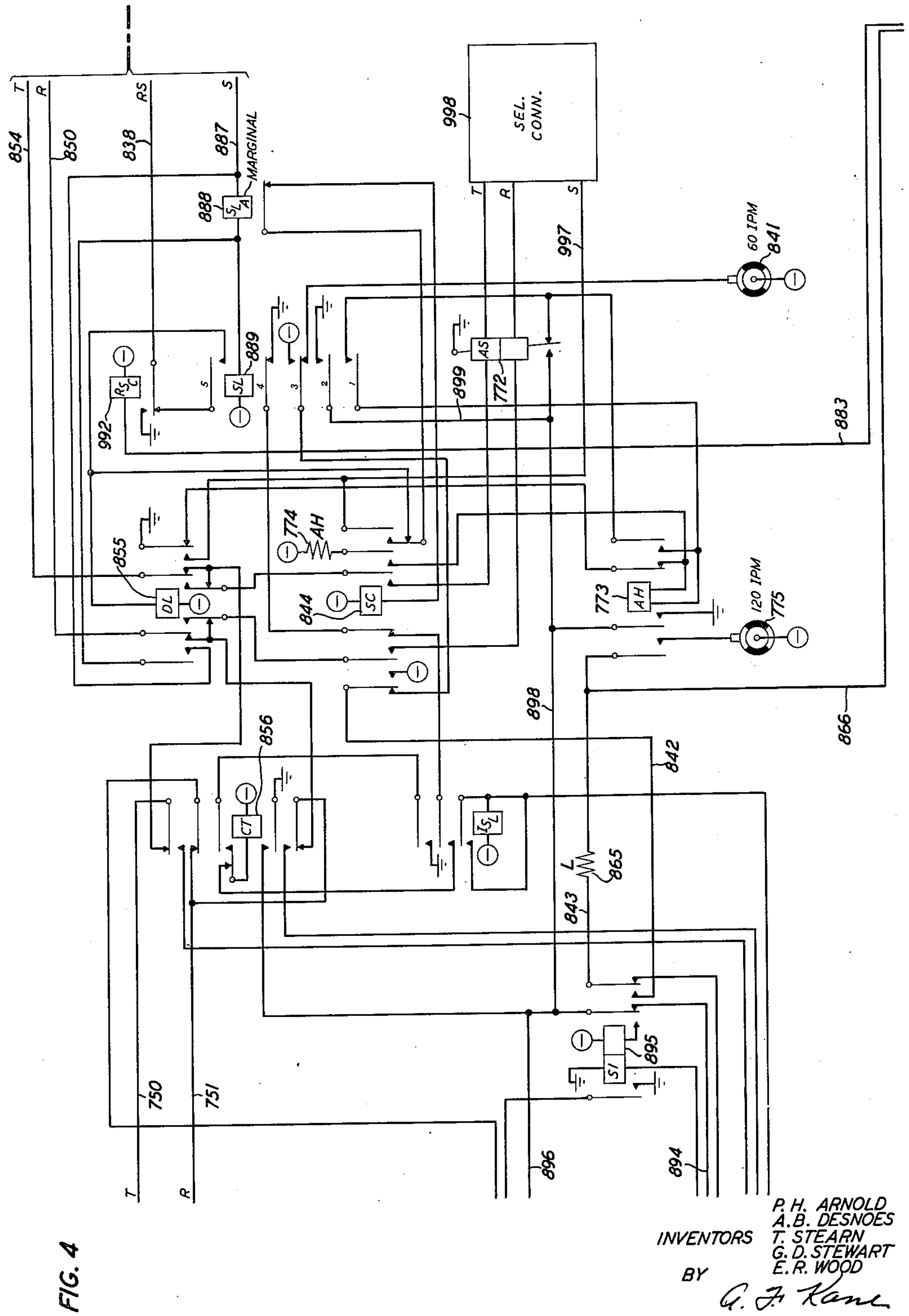
Figure 5:
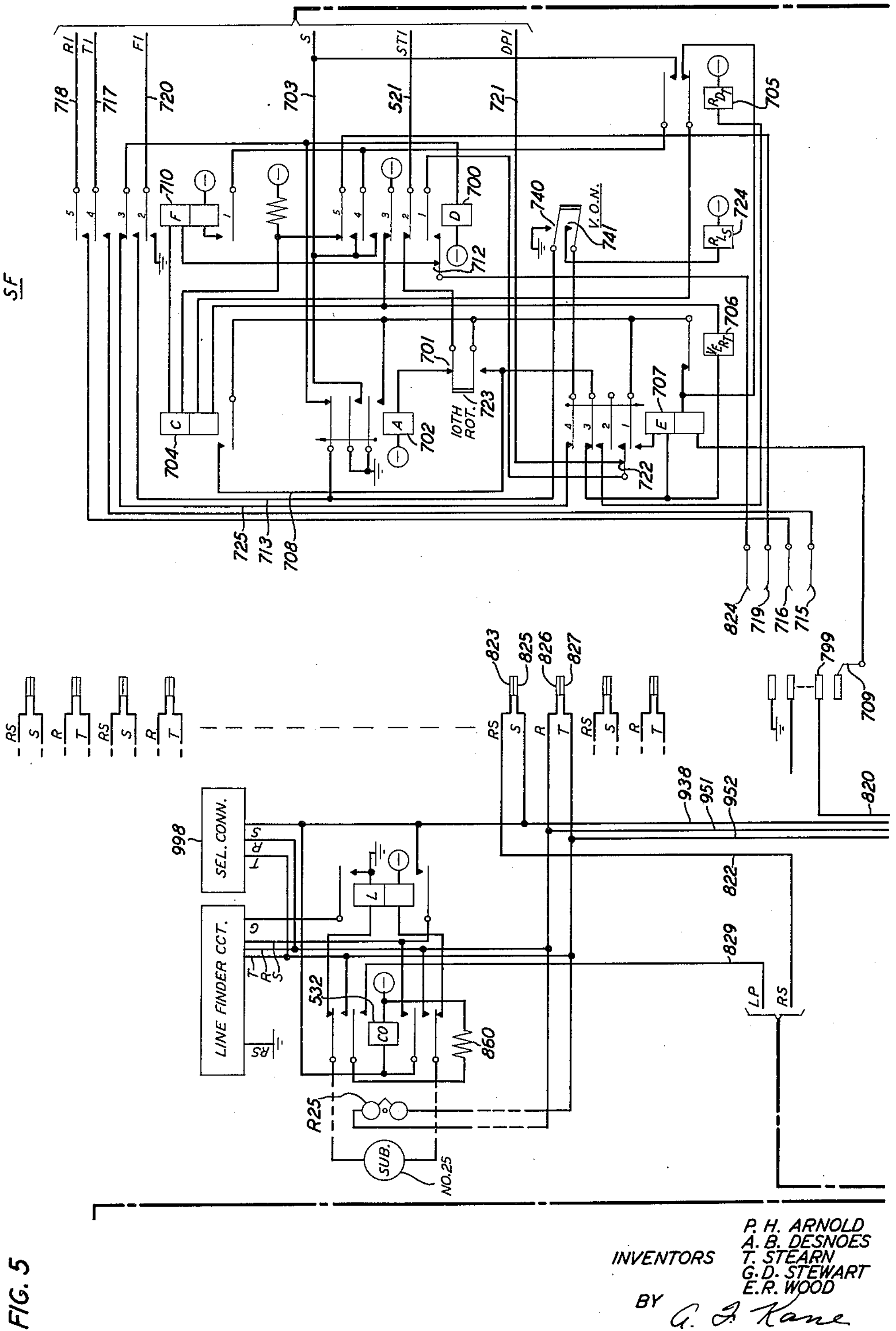
Figure 6:
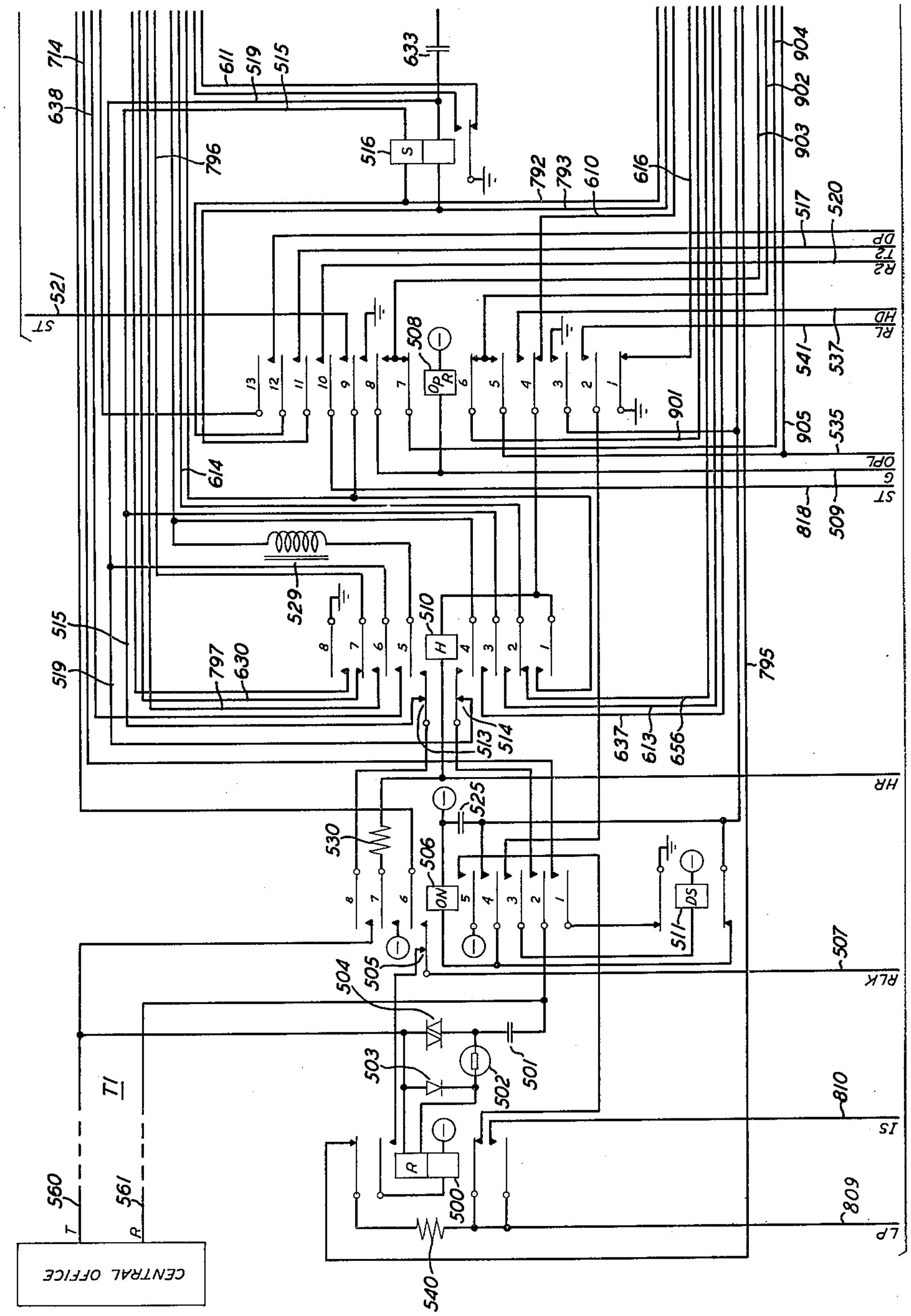
Figure 7:
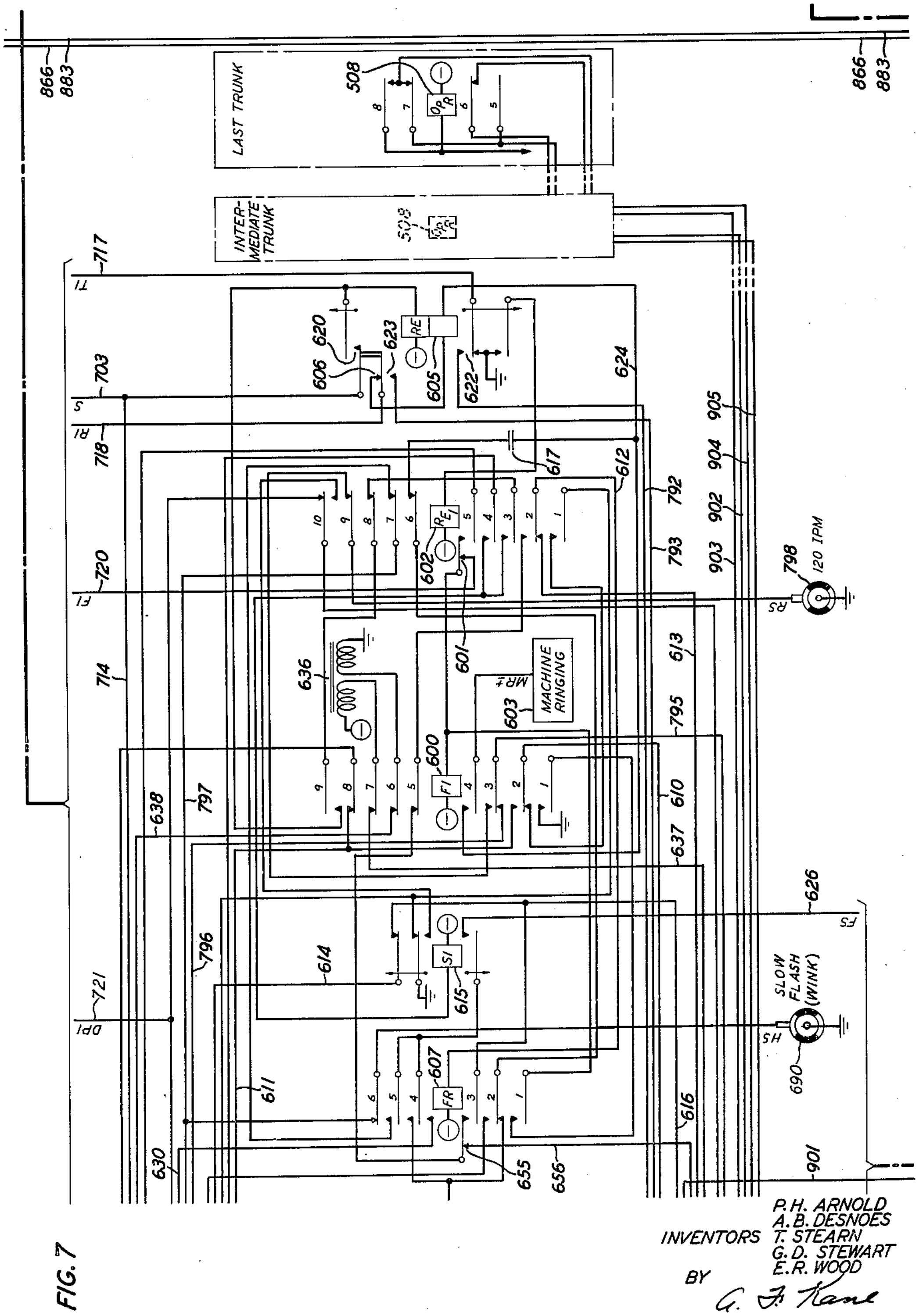
Figure 8:
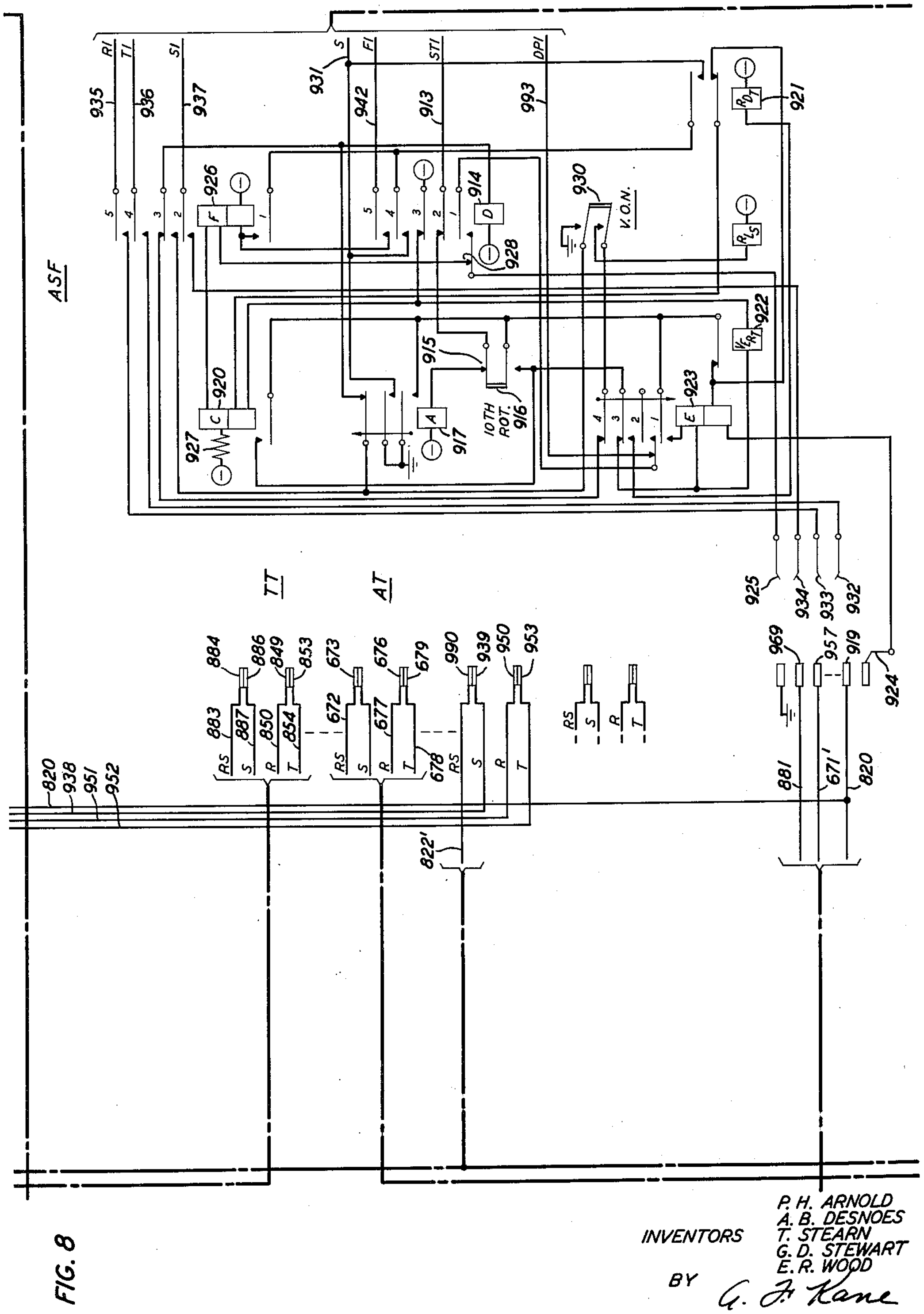
Figure 9:
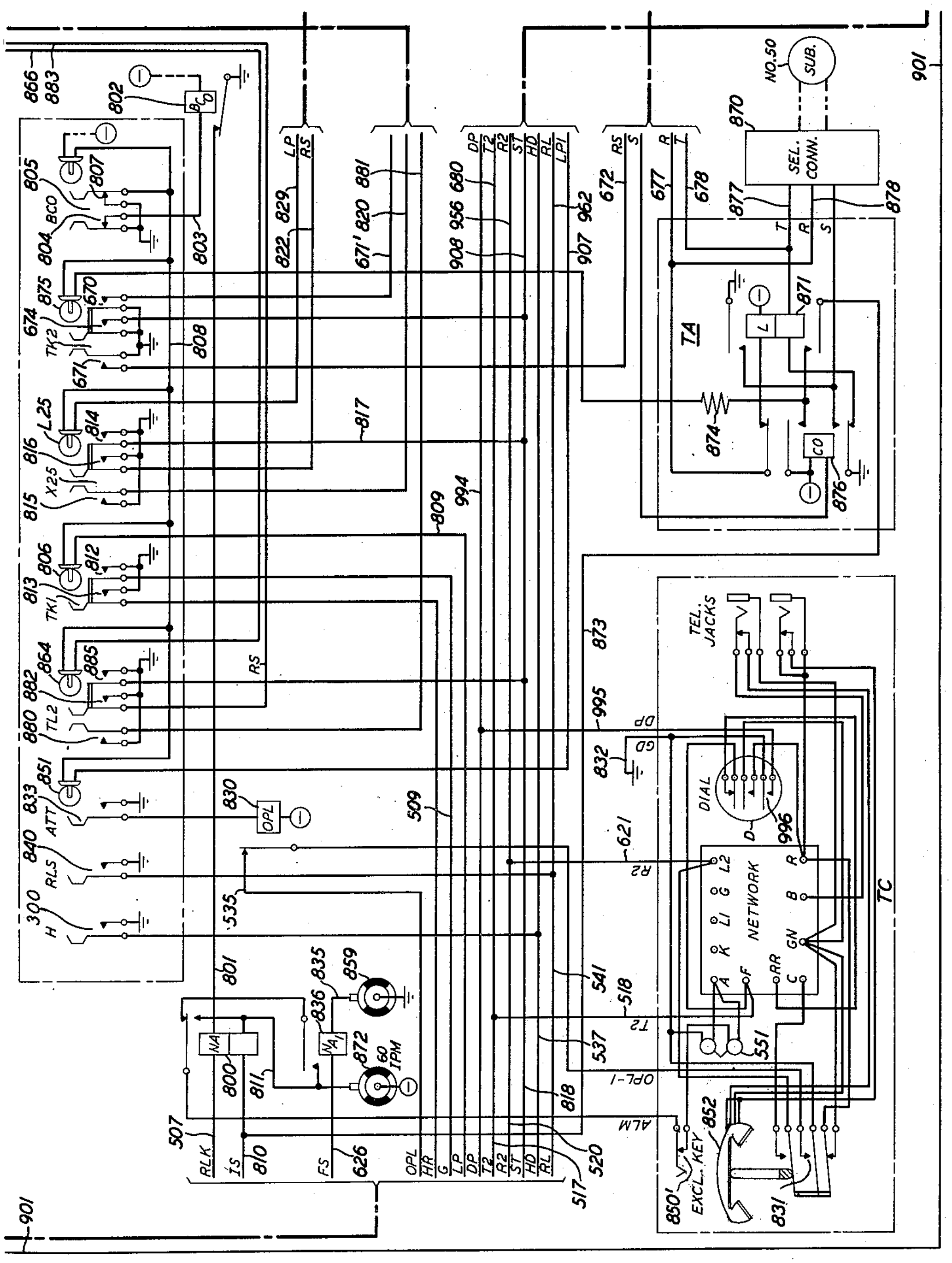
Figure 10:
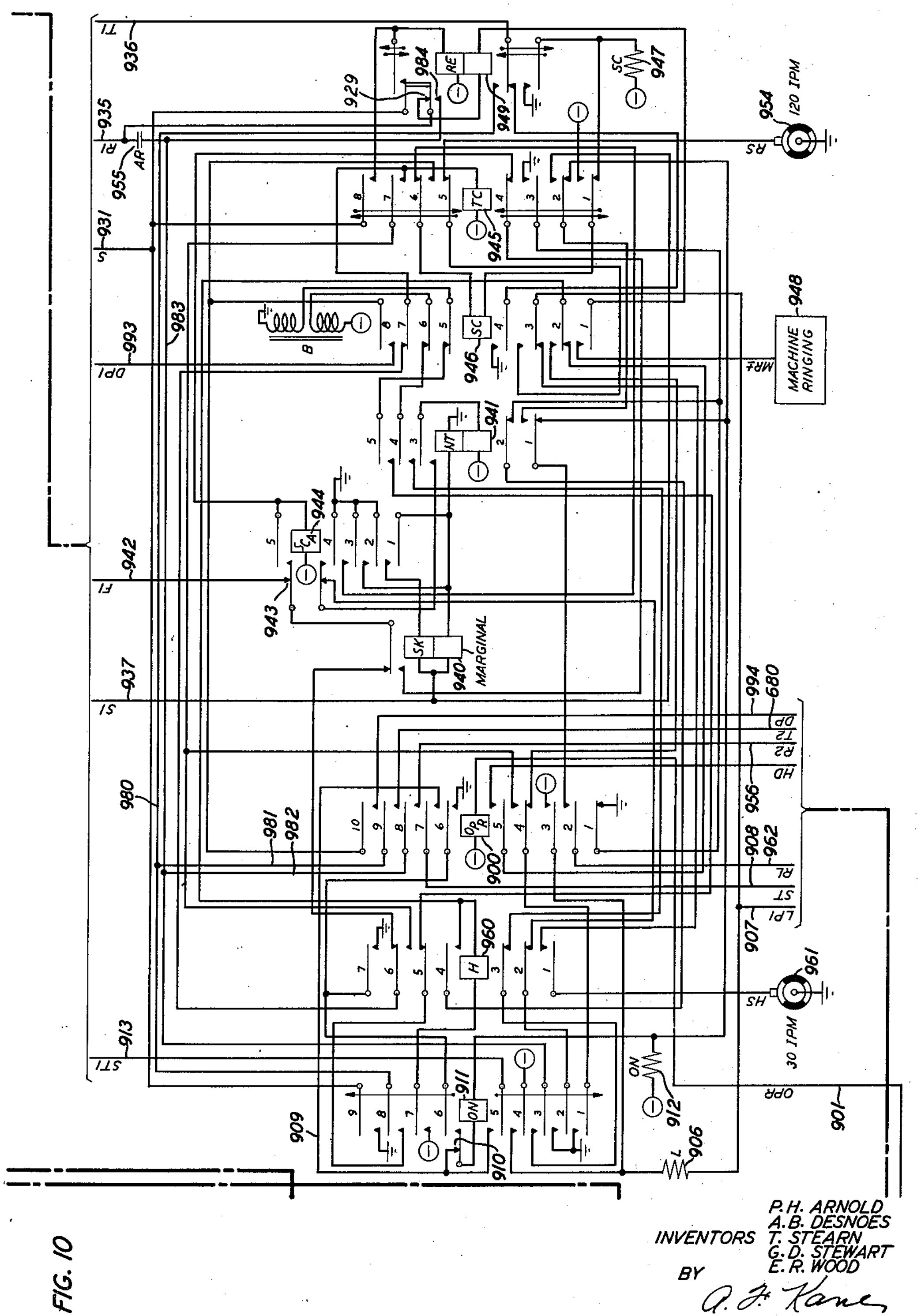

FIGS. 3 and 4, combined, constitute a circuit schematic drawing of an automatic tie trunk serviced by the switchboard of this invention;

FIG. 5 is a circuit schematic drawing of a station finder switch by way of which connections involving, for example, extension stations, one of which is schematically indicated at the left of the figure, may be completed under control of nonlocking illuminated push-button keys at the switchboard shown in FIG. 1, when such connections involve a central office trunk circuit;

FIGS. 6 and 7, combined, constitute a circuit schematic drawing of an attendant's central office trunk circuit which, like the extension stations and tie lines serviced by the switchboard, is identified on the switchboard by a nonlocking illuminated push-button key;

FIG. 8 is a station finder circuit which is key-controlled from the attendant's position to complete calls to extension stations, tie trunks and the like when originated at the attendant's position;

FIG. 9, at the upper portion, illustrates, schematically, a number of illuminated key buttons and keys employed in the detailed description to follow; at the lower left portion, shows the attendant's telephone circuit; and at the lower right portion, illustrates schematically an assistance trunk circuit which is used by restricted extension stations in obtaining assistance of the attendant in the completion of calls; and FIG. 10 is a circuit schematic drawing of a control circuit for the station finder shown in FIG. 8.

Figure 11:
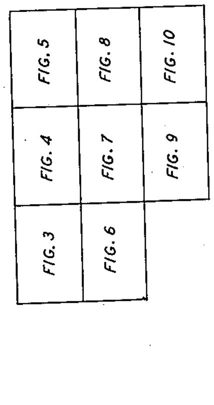

FIG. 11 shows how FIGS. 3–10 are to be arranged.

The following resume of the principles of operation of the switchboard of this invention from a functional standpoint is given as a helpful supplement to the detailed description to be made hereinafter.

The switchboard of this invention employs a new concept in switchboard operation in that a two-motion switch, station finder, is used to provide a link for interconnecting switchboard trunks and extension stations. Each central office trunk is terminated in relay control equipment permanently wired to the station finder, upon whose banks appear the extension lines, assistance trunks and tie lines. The attendant directs the station finder to the desired extension or trunk terminal by momentarily operating the associated push-button key at the switchboard. Thus, upon receipt of an incoming trunk call, the lamp that is physically associated with the trunk key corresponding to the trunk over which the incoming call arrives and which illuminates the key button when lighted, flashes at a rate of 60 times per minute and the bell in the attendant's telephone taps at the same rate. The attendant removes the handset from its cradle support and momentarily presses the trunk button. This causes the light to change from a flashing to a steady signal, indicating that the connection has been established. The attendant then answers the call and obtains from the calling party the identification of the extension desired. She then presses the extension key which lights with a steady signal. At the same time the trunk lamp changes from a steady lamp to one flashing 120 times per minute, indicating to the attendant that the bell at the extension station is being rung automatically. When the station answers, the ringing is tripped and the trunk lamp changes from a fast flash to a steady signal. The attendant is not required to monitor or otherwise service the call after having operated the extension key. She may hang up her handset as soon as she presses the extension button or she may press another key to handle another call. Upon completion of the call the extension hangs up, the connection is automatically released and the trunk and station key lamps are extinguished. If the received call was for a busy extension the attendant would immediately observe that the station key is illuminated and would therefore immediately advise the calling party that the desired extension is busy. If the party desires to wait, the attendant may hold the trunk by operating a hold key which causes the associated trunk key to be illuminated at a slow flash or wink rate. This frees the attendant's telephone set so that she may handle other calls and the wink signal reminds her that the trunk is being held. The attendant then watches the station key to see when it becomes dark or unlighted, indicating the extension is idle. As soon as this occurs the attendant again presses the trunk key and advises the calling party that the desired extension is free. She then depresses the station key momentarily until the key lamp lights indicating that the connection has been made to the station.

In the event a call is received by an extension and it is desired to transfer it to another station, operation of the switchhook momentarily at the station will initiate a flashing recall. This causes the trunk key to be intermittently illuminated at 30 interruptions per minute and the bell in the attendant's telephone taps at the same rate. The attendant then depresses the trunk key and being advised to transfer the call to another extension, she momentarily depresses a release key which causes the station finder to restore to normal. She then depresses the key corresponding to the extension to which the call is to be transferred and the trunk and new extension station are interconnected. The switchboard of this invention provides delayed automatic disconnect, that is, the extensions may flash the attendant without releasing the connection or flashing through to the central office. When the extension station hangs up at the end of a call, the connection is released after a slight delay of about two seconds.

On incoming central office calls the attendant may announce the calling party on a split connection basis by depressing the hold key and then depressing the key of the extension station to which the announcement is to be made. When the extension answers, the connection is split from the trunk and the attendant announces the calling party. If the call is to be put through, the attendant represses the trunk key and the connection is cut through from the trunk to the station and the attendant may monitor to make sure that the call is established, or she may hang up after she announces the call and the connection will be cut through.

Should the attendant wish to call an extension from the switchboard as may be the case if she is a receptionist and wishes to announce a visitor, she removes her handset from its support and depresses the key of the desired station until the key lamp lights. The desired extension is then automatically signaled. When the extension answers the attendant announces the visitor. The connection is automatically released when the attendant hangs up. In the event that the station does not answer, the attendant releases the connection by momentarily operating the release key.

Structurally, the switchboard of this invention may assume any practical design such as shown, by way of example in FIG. 1. As there illustrated, it consists of a sheet metal cabinet 10 having a key button-displaying face which slopes gently upwardly from front to back. The keys are arranged in six or more rows of twelve each, seventy of which in the illustrated embodiment are of the nonlocking illuminated push-button type. The switchboard finish may be of any desired color and generally would match the color of the telephone set 12 with which it functions and which is connected to the switchboard by a suitable plug-ended cable 13.

Figure 1A:
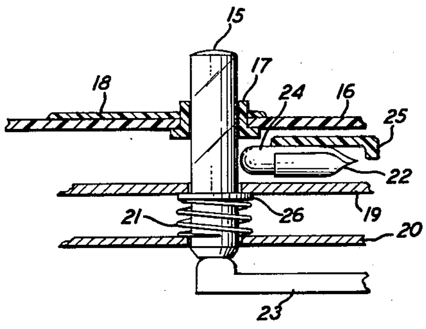
FIG. 1A is a fragmentary view of one arrangement of key button and lamp combination which may be employed in the construction of the switchboard shown in FIG. 1. The illustrated construction is merely for exemplary purposes, it being apparent that other structural arrangements for illuminating the key buttons may be resorted to without departing from the spirit of the invention.

The individual illuminated keys may assume any desirable construction, one such being shown, by way of example, in FIG. 1A. In this exemplary showing each of the key buttons 15 is made of a light-transmitting material and projects downwardly through suitable apertures in mounting plates 19 and 20 so that the lower end is in operative association with the contact springs with which it functions, one of which is indicated at 23. The button 15 extends through the upper face 16 of the console through a grommet 17 suitably anchored in an aperture in the mounting plate 18. The lamps, such as lamp 24, are mounted with contact members 22 on a suitable mounting plate 25 which may be secured to the interior of the cabinet by any well known means. Upon the passage of current through the filament of a lamp 24 the light rays impinge on the button 15 and illuminate it and thereby give a visual indication of the particular condition of the line or trunk designated by the button. The buttons may be of transparent or translucent material. It is to be understood that the combined lamp and button-type key structure constitutes no part of the present invention and may take a form other than that illustrated. The coil spring 21 which alerts the lower plate 20 and a ring-shaped member 26 fixed to the button serve to restore the button to its normal illustrated position after the finger pressure of the attendant is removed. The engagement of the member 26 with the underside of the plate 19 under the action of the spring 21 determines the normal unoperated position of the key.

Figure 2:
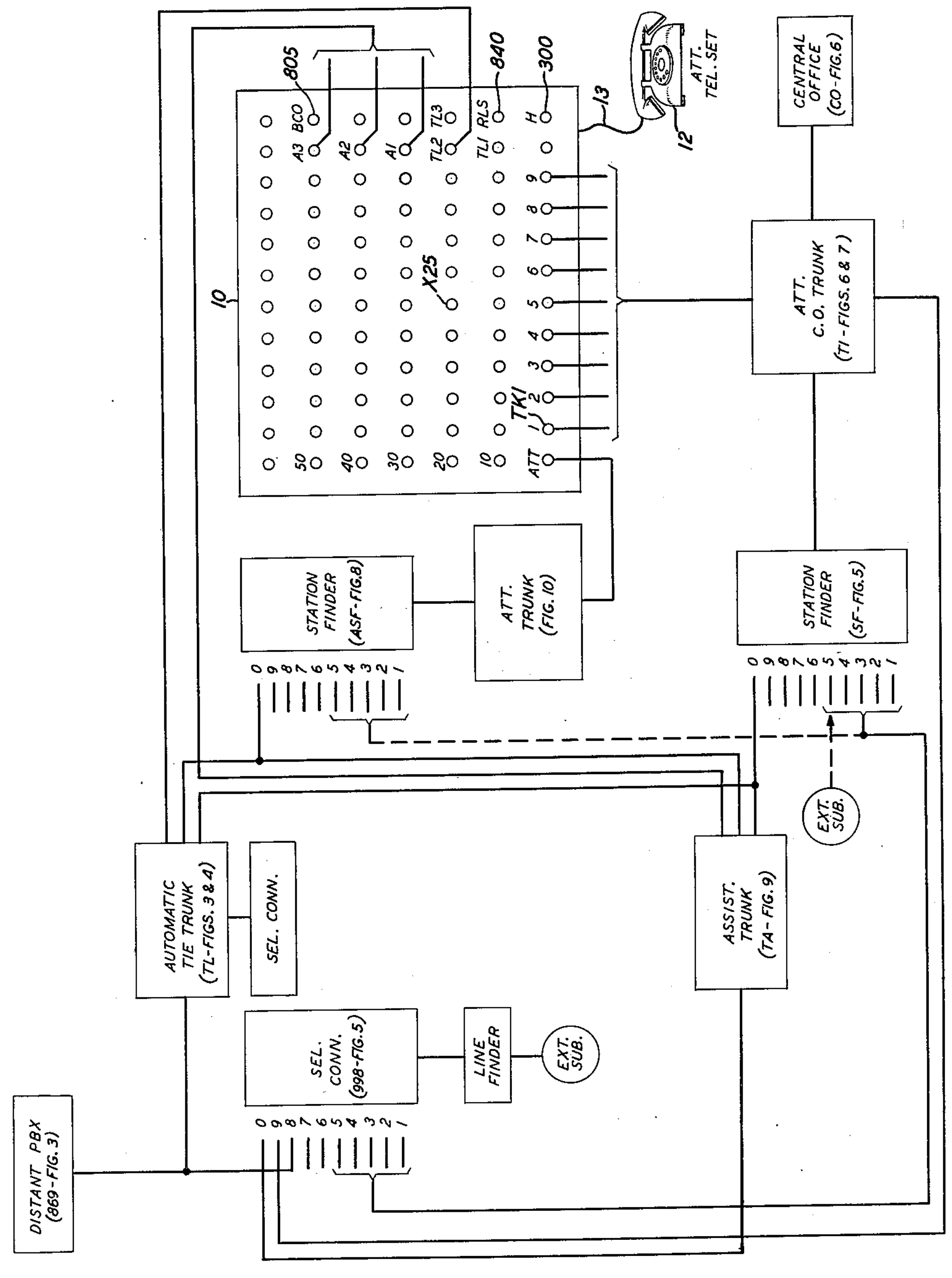
FIG. 2 is a block diagram illustrating a typical traffic layout involving the switchboard of this invention.

Before entering into the detailed description of the operation of the circuits disclosed in FIGS. 3 to 10, inclusive, reference is made to FIG. 2 which consitutes a traffic diagram of a typical installation involving the switchboard of the invention. The block 30 schematically represents the switchboard 10 (FIG. 1) to which the attendant's telephone set 12 is connected by the cable 13. The board is shown having a capacity of seventy-two keys, the first ten of which from the left in the five upper horizontal rows being allocated to fifty extension stations. The lowermost row of buttons starting at the left includes the attendant's key, nine central office trunk keys, a ringdown trunk key and a hold key. The two buttons to the right of the second lower row represent a tie line key and a release key; the two buttons to the right of the fourth row from the bottom represent an assistance trunk key and a spare, as do also the two buttons to the right of the fifth row of keys; and the two buttons to the right of the uppermost row represent an assistance trunk key and a battery cut-off key. Where possible, the designations of these keys as used in the circuit description are repeated in this figure. The remainder of the diagram shown on FIG. 2 shows, in block form, the circuits and switches which function with the key cabinet 30 and identify them in a manner compatible with their identifications as used in the circuit description.

*Incoming call from central office*

When ringing current at the central office, FIG. 6, is applied to the tip and ring conductors 560 and 561 of trunk circuit T1, relay 500 operates in a circuit which includes its upper, or primary winding, capacitor 501, thermistor 502 and the dry rectifiers 503 and 504. Relay 500, operated, locks by way of its lower, or secondary winding in a circuit which includes negative battery, the said lower winding, inner upper armature and front contact of relay 500, normally closed contacts 505 of "off-normal" relay 506, conductor 507, upper winding of relay 800, conductor 801 and the front contact and armature of normally operated relay 802. The latter relay is operated over conductor 803 under control of contacts 804 of the battery cut-off key 805.

At its outer lower armature, relay 500 completes an energizing circuit for trunk lamp 806 which may be traced from ground at contacts 807 of key 805, over conductor 808, through the filament of lamp 806, over conductor 809, the outer lower armature and front contact of relay 500, conductor 810, lower winding of relay 800, conductor 811, to negative battery by way of interrupter 872 which is shown, for convenience, as a mechanical type device, and which may be a relay type of flashing circuit if desirable. This interrupter operates at a rate of 60 interruptions per minute and causes the trunk lamp 806 to flash at the same rate. The audible signal device or telephone ringer 551 associated with the attendant's telephone set TC operates in synchronism with the flashing lamp 806 in a circuit which includes the interrupter 872, conductor 811, front contact and armature of relay 800, contacts of exclusion key 850, ringer 851, conductor 832 and ground. The flashing of lamp 806 and the tapping of the gongs of ringer 851 visually and audibly apprise the attendant that a call is waiting on trunk T1, to which the lamp 806 is individual.

The lamp 806 is structurally associated with the nonlocking trunk key TK1 in such a manner that the translucent button thereof is illuminated thereby. The illuminated key button design may take any desirable form such as is shown, for example, in FIG. 5 of S. T. Curran Patent No. 2,338,757 of January 11, 1944 or as shown in FIG. 1 of the drawings of this application. Upon noting the flashing of lamp 806 the attendant removes the telephone set 852 from its support and momentarily depresses the key TK1 associated with lamp 806, whereupon relay 508 in the trunk circuit T1 operates in a circuit which includes negative battery, the winding of relay 508, conductor 509, contacts 812 of key TK1 and ground. Relay 508 locks over a reverse relay chain which includes armature contacts of relays 508 of all other trunk circuits such as are schematically indicated at the right of FIG. 7. The locking circuit for relay 508 of trunk T1 may be traced from negative battery through the winding and the No. 8 armature and front contact of relay 508, over conductor 903, the No. 6 armatures and back contacts of relays 508 of the intermediate and last trunks, conductor 902, front contact and No. 5 armature of relay 508 of trunk T1, conductor 535, normal contacts of relay 830, switchhook contacts 831, conductor 832, to ground.

At contacts 813, key TK1 prepares a circuit for hold relay 510 in the trunk circuit T1.

At its No. 3 armature and front contact, relay 508 completes an obvious operating circuit for "off-normal" relay 506 which includes the lower armature and back contact of relay 511.

Relay 506, operated, opens the locking circuit for relay 500 causing this relay to release. At its No. 5 armature and front contact, relay 506 completes a circuit in which the trunk lamp 806 is lighted steadily. This circuit includes negative battery, the No. 5 armature and front contact of relay 506, the back contact and inner lower armature of relay 500, conductor 809, filament of lamp 806, conductor 808, contacts 807 of key 805 and ground. The tip and ring conductors of the trunk circuit T1 are now extended to the tip and ring conductors of the attendant's telephone circuit TC, the tip conductor extending over a circuit which includes the tip conductor 560 of the trunk, the No. 8 armature and front contact of relay 506, armature contacts 513 of relay 510, conductor 515, upper winding of relay 516, No. 12 armature and front contact of relay 508, conductor 517, and conductor 518, and the ring conductor extending over a circuit which includes the ring conductor 561 of the trunk, the No. 2 armature and front contact of relay 506, armature contacts 514 of relay 510, conductor 519, lower winding of relay 516, the No. 11 armature and front contact of relay 508, conductor 520, and conductor 521. When the attendant lifts the handset from its support, ringing is tripped in a well-known manner.

Assuming the answering attendant is advised by the calling party on the central office trunk T1 that a connection with the party at extension station No. 25 (FIG. 5), for example, is desired, the attendant selects the desired extension station by momentarily depressing the switchboard key allocated to station No. 25, assuming the desired extension is idle. The attendant is able to note at a glance whether or not the desired extension is idle or busy, the former condition being indicated by the unlighted condition of the key button and the latter condition being manifested by the lighted condition of the key button. It will be assumed that nonlocking key X25 is allocated to the desired extension station No. 25 and that the key button thereof is unlighted indicating the idle condition of the corresponding extension. When the attendant momentarily depresses the key X25, a circuit for relay 702 of the station finder circuit SF (FIG. 5) is completed which includes negative battery, the winding of relay 702, contacts 701 of the tenth rotary step switch of the finder SF, back contact and No. 2 armature of relay 700, conductor 521, front contact and No. 10 armature of trunk relay 508, conductors 818 and 817, contacts 814 of key X25 and ground.

At contacts 815 of extension key X25, ground is extended over conductor 820 to commutator segment 799 of station finder circuit SF, which segment identifies the switch level in which the line terminals of the desired extension station No. 25 are located.

Relay 702 operates in the circuit above traced and at its middle armature and front contact, connects ground to conductor 703, and at its outermost armature and back contact opens the switch release circuit. At its innermost armature and front contact, relay 702 completes an operating circuit for stepper relay 704 which includes negative battery, the No. 3 armature and back contact of relay 700, lower or secondary winding of relay 704, inner armature and back contact of rotary magnet 705, normal back contacts of vertical magnet 706, front contact and innermost armature of relay 702 and ground.

With relay 704 operated, vertical magnet 706 operates in a circuit which includes negative battery, the No. 3 armature and back contact of relay 700, winding of vertical magnet 706, back contact and No. 3 armature of relay 707, conductor 708, front contact and armature of relay 704, front contact and innermost armature of relay 702, and ground at the front contact and innermost armature of relay 702. Magnet 706 operates to release relay 704 and to vertically step the shaft of switch SF in well-known manner. The release of relay 704 releases the vertical magnet 706 which again operates relay 704. This cycle is repeated until the commutator brush 709 of switch SF reaches the segment 799 which is now grounded by the operation of extension key X25. When this segment is engaged by the brush 709, relay 707 operates in series with the secondary winding of relay 704. This holds relay 704 in operated condition to prevent further vertical stepping of the switch SF. Relay 707 is made slow operate to allow a short time delay between the last vertical step and the first rotary step of the switch and thereby to prevent snagging of the wipers which might otherwise occur because of vibration. The operation of relay 707 transfers the stepping circuit from the vertical magnet 706 to the rotary magnet 705.

When extension key X25 was operated, ground was extended over conductor 822 to the line terminal 823 which identifies the line termination of the called extension station No. 25 in the finder switch SF. The rotary magnet 705 now steps the switch shaft around in well-known manner until the wiper 824 of the switch reaches the now grounded terminal 823. When this occurs, relay 710 operates in a circuit which includes negative battery, resistor 711, upper winding of relay 704, upper winding of relay 710, contacts 712 of relay 700, wiper 824 and the engaged terminal 823 of the finder switch SF, conductor 822, contacts 816 of extension key X25 and ground. By holding relay 704 operated at this time, further stepping of the switch is prevented.

Relay 710, operated, causes relay 700 to operate in a circuit which extends from negative battery, over the lower winding of relay 700, the No. 3 armature and front contact of relay 710, conductor 713, to ground at contacts 740 of the vertical off-normal springs VON. Relay 700, operated, opens, at its No. 2 armature contacts, the lead 521 to relay 702, causing this relay to release. At its No. 1 armature, relay 710 completes a locking circuit for itself which includes negative battery, the lower winding, front contact and No. 1 armature of relay 710, the No. 4 armature and front contact of relay 700, conductor 703, conductor 714, front contact and No. 1 armature of relay 506, back contact and upper armature of relay 511 and ground. Relay 710, at its Nos. 4 and 5 armatures and front contacts, cuts through the tip and ring wipers 715 and 716 of switch SF to the trunk circuit T1 by way of conductors 717 and 718, the sleeve wiper 719 being cut through to conductor 703 by the No. 5 armature and front contact of relay 700.

The operation of relay 710 places a direct ground, by way of its No. 2 armature and front contact, on conductor 720 which causes relay 600 to operate in a circuit which includes the continuity contacts 601 of relay 602. This ground serves to indicate to the control circuit, FIGS. 6 and 7, that the station finder has completed its function. Relay 700, at its No. 1 armature and front contact, cuts through the wiper 824 to conductor 721 by way of contacts 722 of relay 707 for dialing on tie lines, which is of no importance in the present description.

If, at the time the grounded terminal 823 is engaged by the wiper 824 the associated sleeve terminal 825 is grounded indicating a busy condition of called extension station No. 25, the resistance battery feed through the upper winding of relay 704 is shunted by the grounded sleeve terminal, thus preventing the operation of relay 710. Rotary stepping of the finder, under this condition, would continue until operation of the tenth rotary step springs 723 causes the release of relay 702 which energizes release magnet 724 and restores the finder switch to normal. The energizing circuit for release magnet 724 includes negative battery, the winding of release magnet 724, contacts 741 of vertical off-normal switch VON, No. 4 armature and back contact of relay 707, conductor 725, back contact and No. 3 armature of relay 710, back contact and outermost armature of relay 702, conductor 713 and ground at the contacts 740 of vertical off-normal switch VON. Should the attendant hold the extension key X25 depressed, the entire cycle repeats itself until the key is released.

When ground is returned on conductor 720 and relay 600 operates, assuming the desired extension station No. 25 is idle, current from the machine ringing supply 603 is transmitted to the called station No. 25 by way of the No. 4 armature and front contact of relay 600, conductor 604, lower winding and contacts 606 of relay 605, conductor 718, No. 5 armature and front contact of relay 710, ring wiper 716 of finder switch FS and the engaged ring terminal 826, windings of ringer R25 at station No. 25, tip terminal 827 and wiper 715 of finder switch FS, front contact and No. 4 armature of relay 710, conductor 717, inner lower armature and back contact of relay 605 and ground. Relay 600, operated, closes, at its No. 3 armature and front contact, a circuit to shunt the trunk lamp 806 at 120 cycles per second. The lamp 806 therefore now flashes at 120 cycles per second in a circuit which includes interrupter 798, the No. 10 armature and back contact of relay 602, conductor 797, front contact and No. 7 armature of relay 510, conductor 796, back contact and No. 3 armature of relay 600, conductor 795, back contact and outer upper armature of relay 500, resistor 540, conductor 809, filament of lamp 806 and ground at contacts 807 of key 805. The operation of ringer R25 serves as a call signal at station No. 25.

Ground potential on the sleeve terminal 825 of finder switch FS causes cut-off relay 532 in the called station line circuit to operate in an obvious circuit. Relay 532, at its outer upper and lower armatures and front contacts cuts the line conductors of station No. 25 through to the corresponding switch terminals 826 and 827 and, at its corresponding back contacts, disconnects the line relay 533 from the station. Lamp L25 which illuminates key X25 is now lighted, as a steady signal, in a circuit which includes negative battery, resistor 860 in the station line circuit, inner upper armature and front contact of relay 532, conductor 829, filament of lamp L25, conductor 808, contacts 807 of key 805 and ground.

Should the operator remove herself from the connection by restoring her handset to its support, relay 508, FIG. 6, would release and relays 510 and 607 would operate. Relay 510 operates in a circuit including negative battery, front contact and No. 7 armature of relay 506, resistor 530, winding of relay 510, No. 4 armature and back contact of relay 508, conductor 610, No. 2 armature and front contact of relay 600, conductor 611, lower armature contacts of relay 516 and ground. The operating circuit for relay 607 includes, negative battery, winding of relay 607, conductor 612, No. 2 armature and back contact of relay 602, conductor 613, No. 2 armature and front contact of relay 510, conductor 614, outer upper armature and back contact of relay 615, conductor 616, back contact and No. 1 armature of relay 508. Relay 510 locks operated and, at its Nos. 4 and 5 armatures and front contacts, connects a holding bridge including coil 529 across the tip and ring conductors of the trunk T1 to prevent re-seizure in case of abandonment. Relay 607, at its No. 2 armature and front contact, connects the ring side of the trunk T1 to condenser 617 to furnish audible ring to the calling party.

When the handset at station No. 25 is removed from its support in response to the operation of ringer R25, relay 605 operates by way of its lower winding through the station loop, it being recalled that when the line to station No. 25 was seized by the station finder SF, the cut-off relay 532 operated on ground on the sleeve terminal 825 of the switch to cut the station through to the tip and ring terminals 827 and 826 of the finder switch. Relay 605 locks by way of its upper winding and armature contacts 620 to ground on the sleeve conductor 703.

At its armature contacts 622 and 623, relay 605 closes the tip and ring conductors 717 and 718 from the finder switch FS to the left terminals of the windings of relay 516 by way of conductors 792 and 793, the right terminals of which are now connected to the tip and ring conductors 560 and 561 extending to the central office, by way of conductors 515 and 519, armature contacts 513 and 514 of relay 510, and the Nos. 2 and 8 armature contacts of relay 506. Relay 605, at its outer lower armature, completes an obvious operating circuit for relay 602.

Relay 602, operated, opens the operating circuit for relay 600, releases relay 607 which opens the locking circuit to relay 600. Also, at its No. 6 armature, relay 602 disconnects the audible ring circuit, transfers the operating circuit of relay 510 and the locking circuit of relay 506 to relay 615.

The trunk lamp 806 is now lighted steadily in a circuit which includes negative battery, the No. 5 armature and front contact of relay 506, back contact and inner lower armature of relay 500, conductor 809, filament of lamp 806, conductor 808, contacts 807 of key 805 and ground.

Relay 516 now operates in series with the extension station loop, whereupon relay 615 operates in a circuit which includes negative battery, the winding of relay 615, front contact and No. 4 armature of relay 602, the upper contact and armature of relay 516 and ground. Relay 615, operated, supplies ground at its inner upper armature and front contact to hold relay 506 locked operated, and releases relay 510 (if relay 508 is released), thereby cutting through the called extension to the central office as noted above. The calling party and the party at extension station No. 25 may now converse over the established connection which includes the trunk circuit T1 and the finder switch SF.

*Disconnection*

When the subscriber at the extension station replaces the telephone set to its support, relay 516 releases, which in turn, releases slow release relay 615. The release of relay 615 reoperates relay 510, which again places the holding bridge 529 across the trunk circuit T1 to prevent reseizure by the central office until final disconnection. Relay 615, released, also removes the locking circuit from relay 506 allowing capacitor 525 to discharge through its winding and thus hold the relay operated for a short time interval. Relay 506, when eventually released, removes ground from conductor 714 and therefore from conductor 703 causing relay 710 in the station finder SF to release. Relay 710, released, closes a circuit to energize the release magnet 724, which operates to return the finder switch FS to normal position. With the removal of ground from conductor 703 by way of conductor 714, relay 605 also releases and, in turn, releases relay 602. Relay 506, released, also removes operating battery from relay 510 causing it to release; reconnects the ringing bridge across the trunk circuit T1; and removes battery from trunk lamp 806 causing this lamp to be extinguished.

When the station finder SF releases, the cut-off relay in the station line circuit releases and removes negative battery from conductor 829 which causes the extension lamp L25 at the switchboard to be extinguished.

*Outgoing call by attendant*

Should the switchboard attendant wish to initiate an outgoing central office call, she momentarily operates the trunk key associated with an idle trunk circuit. The idle condition of the trunk circuit is indicated by the dark, or unlighted condition of the corresponding trunk keys. For purposes of simplification of disclosure and description it will be assumed that trunk circuit T1 is idle as evidenced by the unlighted condition of the key button of key TK1 and that this key is momentarily depressed after the attendant removes her telephone from its support. Relay 508 now operates in a circuit which includes negative battery, the winding of relay 508, conductor 509, contacts 812 of key TK1 and ground. Relay 508 locks operated in a circuit which includes negative battery, the winding and No. 8 armature and front contact of relay 508, conductor 903, No. 6 back contacts of relays 508 of the intermediate and last trunks, conductor 902, No. 5 front contacts of relay 508 of trunk T1, conductor 535, normally closed contacts of relay 830, switchhook contacts 831, conductor 832, and ground.

Relay 508, operated, causes relay 506 to operate over an obvious circuit. Relay 506, operated, removes the ringing bridge including relay 500 from the trunk circuit and cuts the central office through to the attendant's telephone circuit TC. The latter circuit may be traced from the tip conductor 560 of the trunk circuit T1, over the No. 8 armature and front contact of relay 506, contacts 513 of relay 510, conductor 515, upper winding of relay 516, No. 12 armature and front contact of relay 508, conductor 517, conductor 518, through the attendant's telephone set and back over conductors 521 and 520, front contact and No. 11 armature of relay 508, lower winding of relay 516, conductor 519, contacts 514 of relay 510, front contact and No. 2 armature of relay 506 to the ring conductor 561 of the trunk. When dial tone is heard, the attendant dials the desired number by actuating the dial D in accordance with the digits thereof. The call may be completed to an extension station, if desired, in the manner hereinbefore described, that is, by the momentary operation of the station key corresponding to the desired extension station. The trunk key lamp 806 and the station key lamps, such as L25 for example, function as previously described.

The attendant may disconnect by replacing her telephone set on its cradle support or by momentarily depressing the attendant's key 833 or another trunk key. The operation of key 833 operates relay 830, which opens the locking circuit for relay 508, which relay releases.

*Flashing recall*

In the event a subscriber at an extension station such as station No. 25 for example, after a connection has been completed wishes to recall the attendant, the switchhook at such station is momentarily depressed causing the release of relay 516 which, in turn, releases relay 615. Relay 607 then operates in a circuit which includes negative battery, the winding of relay 607, which relay is operated at this time, conductor 612, No. 2 armature and front contact of relay 602, No. 5 armature and back contact of relay 600, contacts 655 of relay 607, conductor 656, back contact and No. 2 armature of relay 510, conductor 614, outer upper armature and back contact of relay 615, conductor 616, back contact and No. 1 armature of relay 508, and ground. Relay 607 then locks by way of its No. 3 armature and front contact. When the switchhook contacts at the called extension are reclosed, relay 516 reoperates and, in turn, operates relay 615. With relays 607 and 615 operated, a path is established by way of conductor 626 in which the trunk lamp, lamp 806 for example, flashes at the rate of 30 interruptions per minute. This flashing circuit includes the flashing circuit, which for purpose of simplicity of disclosure, is shown as a mechanical type interrupter 859, conductor 835, winding of relay 836, conductor 626, front contact and lower armature of relay 615, No. 4 armature and front contact of relay 607, conductor 630, back contact and No. 7 armature of relay 510, conductor 796, back contact and No. 3 armature of relay 600, conductor 795, back contact and outer upper armature of relay 500, resistor 540, conductor 809, filament of lamp 806 and ground at contacts 807 of key 805. The flashing of lamp 807 at the 30 IPM rate apprises the attendant of recall on trunk T1. A clicking audible signal is transmitted to the extension station by way of capacitor 633. Relay 607 releases when the attendant reactuates the trunk key TK1 and relay 508 reoperates.

*Transfer of calls*

In the event a call transfer is to be effected, the attendant depresses release key 840 and thus completes an operating circuit for relay 511 which includes negative battery, the winding of relay 511, No. 3 armature and front contact of relay 506, No. 2 armature and front contact of relay 508, conductor 541 and ground at the contacts of key 840. Relay 511, operated, removes ground, at its upper armature contacts, from conductor 714 and therefore, from sleeve conductor 703 which results in the release of the station finder switch FS. The station key corresponding to the extension station to which the call is to be transferred is now momentarily depressed to effect the connection of the new station to the trunk in a manner now apparent.

*Connection splitting*

Should the attendant find it desirable or necessary to announce the receipt of an incoming central office call to a particular extension subscriber before effecting the completion of the connection between the central office trunk circuit and the particular extension station, she would depress the hold key 850 after previously having operated the trunk key associated with the involved trunk, trunk T1 for example, and ascertained the identity of the extension station desired by the calling party. Relay 510 thereupon operates in a circuit which includes negative battery, the front contact and No. 7 armature of relay 506, resistor 530, winding of relay 510, No. 4 armature and front contact of relay 508, conductor 537, contacts of hold key 850 and ground. Relay 510, operated, locks to ground at the No. 9 armature and front contact of relay 508 by way of its own No. 1 armature and front contact. At its No. 7 armature and front contact relay 510 completes an energizing circuit for trunk lamp 806 which extends from ground at the "slow flash" or "wink" interrupter 690 (FIG. 7), over the No. 6 armature and back contact of relay 607, conductor 797, the front contact and No. 7 armature of relay 510, conductor 796, the back contact and No. 3 armature of relay 600, conductor 795, the back contact and outer upper armature of relay 500, resistor 540, conductors 801 and 809, filament of lamp 806, to battery on conductor 808. The lamp 806 operates at a slow-flash or wink frequency in this circuit as a hold signal. At its Nos. 4 and 5 armatures and associated continuity contacts, relay 510 splits the central office from the connection and connects a holding bridge, which includes the coil 529, across the central office end of the trunk. At its Nos. 3 and 6 armatures and front contacts, relay 510 connects battery and ground through retard coil 636 to the called end of the trunk. This circuit may be traced from negative battery, through the left winding of coil 636, No. 7 armature and back contact of relay 600, conductor 637, front contact and No. 3 armature of relay 510, conductor 515, to the upper winding of relay 516, and from ground through the right winding of coil 636, the No. 6 armature and back contact of relay 600, conductor 638, front contact and No. 6 armature of relay 510, conductor 519, to the lower winding of relay 516. With the central office connection held, as described, the attendant momentarily actuates the station key corresponding to the extension station at which the announcement is to be made, key X25 for example. The station finder SF then operates in the manner previously described to complete the connection, except that when the extension answers, the called line is cut through to the attendant's position and not to the central office. After announcing the call to the extension and being requested by the subscriber thereon to complete the connection of the trunk to the extension, the attendant either represses the involved trunk key, TK1 for example, which shunts down relay 510 to effect the cut through to the central office, or hangs up her telephone which releases relay 508, thus unlocking relay 510, which releases and cuts through the central office trunk to the called extension.

Should the attendant wish to call an extension station, such as station No. 25 for example, from the switchboard, as may be the case of a receptionist desiring to announce a visitor, she removes the handset from its support and momentarily depresses the nonlocking station key, key X25 for example, corresponding to the desired extension station. Relay 900 in the attendant's station finder circuit ASF, FIG. 8, thereupon operates in a circuit which includes negative battery, the winding of relay 900, conductor 901, No. 6 armature and back contact of relay 508 of the first central office trunk circuit T1, conductor 902, No. 6 armatures and back contacts of all similar relays 508 of all intermediate central office trunks and of relay 508 of the last trunk (the intermediate and last trunk circuits are represented by the blocks shown at the right of FIG. 7), conductor 903, back contact and No. 7 armature of relay 508 of trunk T1, conductor 904, back contacts and No. 7 armatures of all relays 508 of intermediate trunks and of relay 508 of the last trunk, conductor 905, conductor 535, normal contacts of relay 830, switchhook contacts 831 of the attendant's telephone set, conductor 832, and ground.

Relay 900, at its No. 3 armature and front contact, completes an energizing circuit for the attendant's lamp 851 which may be traced from negative battery, over the front contact and No. 3 armature of relay 900, resistor 906, conductor 907, filament of lamp 851, to ground at contacts 807 of key 805. The lamp 851 is lighted steadily in this circuit.

When the nonlocking station key, key X25 for example, is momentarily depressed, ground at contacts 814 of the key is extended over conductors 817 and 908, the No. 7 armature and front contact of relay 900, conductor 909, normal continuity contacts 910 and winding of relay 911, resistor 912 to negative battery. Relay 911 operates in this circuit and locks the ground by way of the No. 6 armatures and front contacts of relays 911 and 900.

By way of the No. 7 armature and front contact of relay 900 and the front contact and No. 5 armature of relay 911, the ground on conductor 908 is extended to conductor 913, thence over the No. 2 armature and back contact of relay 914 in the station finder circuit ASF, contacts 915 of the tenth rotary step switch 916, through the winding of relay 917 to negative battery. Relay 917 operates in this circuit.

At contacts 815 of key X25, ground is connected to conductors 820 and 820′ and thence to terminal 919 of the commutator of switch ASF, which terminal identifies the switch level in which the desired station line terminals are located. At contacts 816 of key X25 ground is connected to conductors 822 and 822′ and thence to terminal 990 of the switch ASF which is included in the particular group of switch terminals allocated to the called extension station No. 25.

Relay 917 operates as described above and, at its middle armature and front contact, connects ground to the sleeve lead 931. At its lowermost armature and front contact, relay 917 completes an operating circuit for relay 920 which includes negative battery at the No. 3 armature and back contact of relay 914, the lower winding of relay 920, inner armature and back contact of rotary magnet 921, contact and armature of vertical magnet 922, front contact and innermost armature of relay 917 and ground. Relay 920, operated, causes the vertical magnet 922 to operate in a circuit which includes negative battery, the No. 3 armature and back contact of relay 914, winding of vertical magnet 922, back contact and No. 3 armature of relay 923, front contact and armature of relay 920, front contact and innermost armature of relay 917, and ground. The vertical magnet steps the shaft of station finder ASF vertically in a well-known manner, and opens the operating circuit to relay 920 causing this relay to release. The release of relay 920 releases the vertical magnet 922 which again operates relay 920. This cycle repeats itself until the commutator brush 924 reaches the grounded commutator segment 919.

When the grounded segment 919 is reached, relay 923 operates in a circuit which includes negative battery, the No. 3 armature and back contact of relay 914, the lower winding of relay 920, inner armature and back contact of rotary magnet 921, lower winding of relay 923, commutator brush 924 and segment 919, conductors 820' and 820, contacts 815 of key X25 and ground. This holds relay 920 in operated position to prevent further stepping. The operation of relay 923 transfers the stepping circuit from vertical magnet 922 to rotary magnet 921. The rotary magnet 921 then steps the switch shaft around in well-known manner, until the wiper 925 engages the switch terminal 990 which, as previously described, is grounded by the operation of key X25. Relay 926 now operates in a circuit which includes negative battery, resistor 927, upper winding of relay 920, upper winding of relay 926, contacts 928 of relay 914, switch wiper 925 and terminal 990, conductors 822' and 822, contacts 816 of key X25 and ground. Relay 920 is held operated at this time to prevent further rotary stepping of the station finder ASF. With relay 926 operated, relay 914 operates in an obvious circuit which includes ground at the vertical off-normal springs 930.

Relay 914, operated, opens the lead 913 to relay 917 causing this relay to release, and closes a path to lock relay 926, by way of its lower winding, to conductor 931 which is grounded at the No. 9 armature and front contact of relay 911. Operation of relay 926 closes through the tip ring and sleeve wipers 932, 933 and 934 and through to the conductors 935, 936 and 937, respectively, of the control circuit, FIG. 9.

The line cut-off relay 532, FIG. 4, now operates in a circuit which includes negative battery, the winding of relay 532, conductor 938, terminal 939 of switch ASF, wiper 934, front contact and No. 2 armature of relay 926, conductor 937, lower winding of marginal relay 940, upper winding of relay 941 and ground. Relays 940 and 941 also operate in this circuit.

When relays 926 and 914 operate, as previously described, the ground on conductor 931 is extended over the front contact and No. 4 contact of relay 914, the No. 1 armature and front contact of relay 926, the front contact and No. 5 armature of relay 914, to conductor 942, and thence over contacts 943 of relay 944, armature and front contact of relay 940, No. 4 armature and back contact of relay 945, winding of relay 944 to negative battery. Relay 944 operates in this circuit and at its No. 3 armature and front contact, completes an obvious operating circuit for relay 946 which includes negative battery, resistor 947, and the back contacts and Nos. 1 and 6 armatures of relay 945.

With relay 946 operated, ringing current from the source 948 is transmitted over a circuit which includes the front contact and No. 1 armature of relay 946, the lower winding of relay 949, contacts 950 of relay 949, conductor 935, No. 5 armature and front contact of relay 926, switch wiper 933 and terminal 950, conductor 951, windings of ringer R25 at the called station No. 25, conductor 952, switch terminal 953 and wiper 932, front contact and No. 4 armature of relay 926, conductor 936, inner lower armature and back contact of relay 949, No. 4 armature and front contact of relay 946, and ground. The ringer R25 operates in this circuit as a call signal. The attendant's lamp 851 now flashes in a circuit which includes negative battery, 120 IPM interrupter 954, back contact and No. 5 armature of relay 945, front contact and No. 3 armature of relay 946, conductor 907, filament of lamp 851, contacts 807 of key 805 and ground. The flashing of lamp 851 serves as a ringing indication to the attendant. The attendant also receives audible ringing through condenser 955, it being observed that this condenser is connected to conductor 956, by way of the No. 8 armature and front contact of relay 900, which conductor connects with conductor 521 leading to the attendant's telephone.

When the called station No. 25 answers, relay 949 operates over the station loop and locks by way of its upper armature and front contact. The operating circuit for relay 949 includes machine ringing source 948, front contact and No. 1 armature of relay 946, lower winding of relay 949 and its contacts 950, conductor 935, No. 5 armature and front contact of relay 926, switch wiper 933 and terminal 950, conductor 951, over the called station loop, and back over conductor 952, switch terminal 953 and wiper 932, front contact and No. 4 armature of relay 926, conductor 936, inner lower armature and back contact of relay 949, No. 4 armature and front contact of relay 946, and ground. The locking circuit for relay 949 includes negative battery, the upper winding of relay 949, upper armature and front contact of relay 949, and ground by way of the No. 9 armature and front contact of relay 911. The operation of relay 949 disconnects the machine ringing current source 948 and cuts through the tip and ring leads 936 and 935 to the corresponding leads 518 and 521 of the attendant's telephone circuit to establish the talking path between the attendant's position and the called station No. 25. Operation of relay 949 also shunts battery to relay 946 causing the release of this relay. With relay 946 released, the interrupter 954 is disconnected and the attendant's lamp 851 is lighted steadily from battery at the No. 3 armature contacts of relay 900.

Should the attendant leave the connection while it is in the ringing condition relay 900 releases and relay 960 operates in a circuit which includes negative battery, front contact and No. 7 armature of relay 911, winding of relay 960, No. 2 armature and front contact of relay 946, back contact and No. 4 armature of relay 900, No. 1 armature and front contact of relay 911 and ground. Relay 960 locks in a circuit which includes negative battery, front contact and No. 7 armature of relay 911, winding of relay 960, front contact and No. 4 armature of relay 960, No. 2 armature and back contact of relay 941, No. 1 armature and back contact of relay 900 and ground. Relay 960, operated, re-establishes operating ground for slow release relay 911 which ground was removed by the release of relay 900.

If the called station answers before the attendant goes back on the connection, relay 949 operates as described above, and shunts down relay 946 which closes a path from the 30 IPM interrupter 961, over the No. 1 armature and front contact of relay 960, back contact and No. 3 armature of relay 946, conductor 907, filament of the attendant's lamp 851 to ground by way of contacts 807 of key 805. The attendant's lamp 851 thus flashes at a slow rate to provide a "wink" signal which serves as a visual indication to the attendant that the called party has answered. When the attendant re-enters the connection by the operation of key 833 relay 900 operates, releasing relay 960, and establishes the talking path.

*Disconnection*

Disconnection takes place when the attendant hangs up the telephone handset, or depresses key 833 or another trunk key. Under these conditions relay 900 releases. As the called station has answered, relay 946 will be released so that relay 960 does not now operate. After a short interval, slow release relay 911 releases and removes ground from the sleeve conductor 931 of the station finder ASF causing the finder switch to release in well-known manner. The release key 840 may also be used by the attendant to disconnect the station finder. When operated, key 840 applies ground to conductor 962 which shunts down relay 911 causing the release of the station finder switch.

*Call from extension to attendant*

When a dial station such as station No. 50 (FIG. 9) wishes to reach the attendant, the digit "0" is dialed and the selector or selector connector 870 functions, in well-known manner, to connect the calling station to the trunk circuit TA shown schematically at the lower right of FIG. 9. Relay 871 operates over the station loop and closes a circuit from the battery interrupter 872 over conductor 811, the lower winding of relay 800, conductor 873, lower armature and front contact of relay 871, resistor 874, filament of trunk lamp 875, to ground at contacts 807 of key 805 to cause this lamp to flash at the switchboard. Relay 871, at its upper armature and front contact applies ground to the sleeve lead of the selector connector 870 to hold the selector connector in well-known manner.

When the attendant answers the call, she removes the telephone set 852 from its support and momentarily depresses the push-button key TK2 associated with the flashing lamp 875. At contact 670 key TK2 applies ground potential to conductor 671 which connects with commutator segment 680 of the attendant's station finder switch ASF which identifies the switch level in which the terminals of the assistance trunk TA appears. At contact 671 the key TK2 applies ground potential to conductor 672 which connects with switch terminal 673 of the terminal group AT assigned to the assistance trunk TA in the switch ASF. At contact 674 key TK2 applies ground potential to conductor 908 which, with the telephone set 852 removed from its support and relay 900 therefore operated, the attendant's station finder ASF starts to operate. The station finder circuit ASF functions in the manner described hereinbefore, up to the time the finder cuts through to the trunk which, in this case, is trunk TA which is identified in the station finder ASF by the terminal group designated AT in FIG. 8, as above described. Under this condition, the sleeve conductor associated with switch wiper 934 is extended to the control circuit (FIG. 10) by way of conductor 937. Ground on this conductor causes the cut-off relay 876 in the assistance trunk TA to operate. At its lower armature and front contact relay 876 connects ground to the selector connector 870 to hold it operated and, at its inner upper armature and front contact, it connects steady battery to lamp 875 by way of resistor 874 to cause the lamp 875 to be lighted steadily. The windings of relay 871 are removed from the tip and ring leads 877 and 878 by the operation of relay 876 and relay 871 thereupon releases.

Relay 876 in the trunk circuit TA is of such resistance as to prevent the operation of marginal relay 940 in the control circuit at this time. Relay 941 however does operate and locks under control of the No. 2 armature of relay 911. Ground on conductor 942 from the station finder ASF causes the operation of relay 945 in a circuit which includes normal contacts 943 of relay 944, armature and back contact of relay 940, back contact and No. 6 armature of relay 960, back contact and No. 7 armature of relay 946, winding of relay 945 and negative battery. Relay 945, operated, locks to ground at the No. 1 armature and front contact of relay 911. Relay 949 now operates by way of its upper winding over an obvious circuit. The tip and ring leads 935 and 936 extending from the finder ASF are now extended to the conductors 518 and 521, respectively, which connect with the attendant's telephone set. The talking connection between the attendant and the attendant's trunk TA is thus completed. This talking circuit may be traced from the ring conductor 521 extending from the attendant's telephone circuit TC, conductor 956, front contact and No. 8 armature of relay 900, contacts 984 of relay 949, conductor 935, No. 5 armature and front contact of relay 926, switch wiper 933 and engaged terminal 676, conductor 677, over the tip conductor 877 of trunk TA and the corresponding tip conductor of the established connection to the calling station No. 50, back over the tip conductor 678 of the trunk TA, switch terminal 679, switch wiper 932, front contact and No. 4 armature of relay 926, conductor 936, inner lower armature and front contact of relay 949, No. 9 armature and front contact of relay 900, conductors 680 and 518 to the attendant's telephone circuit TC.

The calling party may now inform the attendant of the telephone designation of the line with which connection is desired. The attendant then advises the calling party that she will complete the call and requests the calling party to hang up. This latter act releases the switch train including the selector connector 870. The attendant then presses an idle trunk key, such as key TK1 for example, dials the requested central office number and then presses the extension key, such as key X25, of the calling station. These operations complete the connection from the calling station No. 50 to the central office trunk, T1 for example, and the switches at the central office further extend the call to the called station in accordance with the designation digits dialed by the attendant. No ringing current is applied under this condition as relay 946 is not operated.

Disconnection is accomplished by the attendant hanging up the receiver or depressing the attendant's key 833 or another trunk key. No action will take place when the calling station disconnects if the attendant fails to do likewise. When the attendant disconnects, the station finder ASF will restore and relay 876 will release. If the calling station has also disconnected at this time the selector connector 870 will restore in well-known manner. If the station has not disconnected, relay 871 will reoperates as soon as relay 876 releases and the selector connector will hold, and lamp 875 will light with a flashing signal.

*Attendant's "no test" feature*

This "no test" feature allows the attendant to connect to a busy station line. Operation proceeds as described hereinbefore in connection with a call from the attendant to an extension station until the station finder cuts through to the desired station terminals. When this occurs the sleeve lead 937 will be grounded so that relays 940 and 941 will be shunted. When ground is received over conductor 942, relay 945 operates causing relay 949 to operate and connect the attendant's telephone to the busy station. With relay 941 normal, no battery and ground is supplied and the attendant uses battery and ground from the busy circuit for talking.

*Outgoing call from attendant to distant P.B.X*

Should the attendant find it necessary to initiate a call to a distant P.B.X she would momentarily operate the push-button key associated with an idle tie line. Various types of the lines can be employed with the switchboard of this invention though but one type is illustrated in the drawings. This type is a 2-way manual and dial selected type and is schematically shown in FIGS. 3 and 4. The push-button key TL2 shown in FIG. 9 is assumed to correspond to the tie line TL shown in FIGS. 3 and 4. To initiate a call over this tie line which extends to the distant P.B.X 869 indicated at the upper left of FIG. 3, the key TL2 is momentarily depressed. Ground at contacts 880 of key TL2 is now connected to conductor 881 which, in turn, is connected to the commutator terminal 969 of finder switch ASF, which terminal corresponds to the No. 7 switch level in which the terminals of tie line TL, FIGS. 3 and 4, appear. At contacts 882 of key TL2, ground is extended over conductor 883 to operate relay 992 in the tie line TL which, in turn, applies ground to conductor 790 which is connected to the terminal 884 of the terminal group TT of switch ASF which group is allocated to the tie line TL. At contacts 885 of key TL2, ground is connected to the start lead 908 which extends to the control circuit (FIG. 10) of the finder switch ASF.

The attendant's station finder ASF now functions, in the manner hereinbefore described, to select the bank terminals TT associated with the tie line TL. Relay 889 in the tie line then operates in a circuit which includes negative battery, winding of relay 889, winding of marginal relay 888, conductor 887, terminal 886 of finder switch ASF and its associated wiper 934, front contact and No. 2 armature of relay 926, conductor 937 which is now grounded in the control circuit, FIG. 10. At its No. 2 armature and front contact, relay 889 completes operating circuits for relays 890 and 891 which may be traced from ground, over the front contact and No. 2 armature of relay 889, conductors 899 and 898, thence over two parallel branches one including conductor 896, the winding of relay 891 and negative battery, and the other including the inner right armature and back contact of relay 895, conductor 894, the winding of relay 890 and negative battery.

Relay 890, operated, connects battery and ground through the windings of relay 892 and of coil 893 to the ring and tip conductors 862 and 863 of the tie line TL as a seizure signal to the distant end.

Relay 891, operated, completes an energizing circuit for lamp 864 at the attendant's switchboard which includes negative battery, the outer lower armature of relay 891, back contact and outer right armature of relay 895, resistor 865, conductor 866, filament of lamp 864, conductor 808, contacts 807 of key 805 and ground. The lamp 864 and its associated key TL2 are lighted steadily at this time.

Relay 890, at its outer upper armature and front contact, grounds the selector level sleeve conductor 867 of selector connector 868 to make it test busy to other calls.

When the attendant at the distant P.B.X 869 answers the call a low resistance shunt is connected across the tip and ring conductors 863 and 862 of the tie line TL which causes the operation of relay 892. Relay 892, operated, closes a circuit for a holding bridge which includes the coil 858. The speech path between the distant P.B.X 869 and the attendant's telephone now may be traced from the tip conductor 863 of tie line TL, condenser 857, outermost upper armature and back contact of relay 856, back contact and inner right armature of relay 855, conductor 854, terminal 853 and associated wiper 832 of finder switch ASF, front contact and No. 4 armature of relay 926, conductor 936, inner lower armature and front contact of relay 949, conductors 980 and 981, No. 9 armature and front contact of relay 900, conductors 680 and 518, through the attendant's telephone and back over conductors 521 and 956, front contact and No. 8 armature of relay 900, conductors 982 and 983, contacts 984 of relay 949, conductor 935, No. 5 armature and front contact of relay 926, wiper 933 and associated terminal 849 of switch ASF, conductor 850, inner left armature and back contact of relay 855, outer lower armature and back contact of relay 856, condenser 847 to the ring conductor 826 of the tie line TL. The attendant at the switchboard of this invention and the attendant at the distant P.B.X may now converse.

When the attendant at the distant P.B.X disconnects, the resistance in series with relay 892 is increased causing the relay to release. Relay 892, released, releases the holding bridge. When the attendant at the near end disconnects, the station finder ASF releases, as is now understood, causing the release of relay 889 which, in turn, releases relays 890 and 891 thus restoring the circuit to normal. Make busy ground is removed from the selector level sleeve conductor 867 when relay 890 releases.

*Incoming calls from distant P.B.X*

When a tie line, TL for example, is selected at the distant P.B.X, battery and ground are supplied over the tip and ring conductors 863 and 862 causing relay 845 to operate over an obvious circuit. Relay 845, operated, causes relay 895 to operate over an obvious circuit. Relay 895, at its left armature and front contact grounds the selector level sleeve conductor 867 to make it test busy. At its outer armature and front contact, relay 895 interconnects conductors 843 and 842 whereupon the tie line lamp 864 and its key button TL2 are lighted over a circuit which includes negative battery, the 60 IPM interrupter 841 (illustrated for convenience as a rotary mechanical type device), back contact and No. 3 armature of relay 889, back contact and outermost left armature of relay 844, conductor 842, front contact and outer right armature of relay 895, conductor 843, resistor 865, conductor 866, filament of lamp 864, conductor 808, contacts 807 of key 805 and ground. The lamp 864 flashes at a 60 IMP rate in this circuit as an indication to the attendant that a call is waiting on the tie line TL.

The attendant answers the call by momentarily pressing the TL2 key whereupon the station finder ASF functions, in a manner now apparent, to select the switch terminals TT which are assigned to the tie line TL. When the switch wipers engage the tie line terminals, relay 889 operates as previously described, causing the lamp 864 to be lighted steadily and to illuminate the key TL2 in a corresponding manner under control of relay 891, which relay operates under control of relay 889. The lamp 864 is lighted in a circuit which includes negative battery, outer lower armature and front contact of relay 891, back contact and outer right armature of relay 895, conductor 843, resistor 865, conductor 866, filament of lamp 864, contacts 807 of key 805 and ground.

Relay 991 operates in an obvious circuit which includes the upper armature and front contact of relay 891 and the armature and front contact of relay 845. Relay 991, at its lower armature and front contact, connects a holding bridge, including coil 858, across the tie line TL.

If the incoming call is for an extension station the attendant dials the requested number. When the dial D moves off normal, a circuit is completed for the operation of relay 855 in the tie trunk TL which may be traced from negative battery, through the winding of relay 855, over the front contact and No. 5 armature of relay 889, back contact and armature of relay 992, conductor 883, terminal 884 and wiper 925 of switch ASF, front contact and No. 1 armature of relay 914, normal continuity contacts of relay 923, conductor 993, front contact and No. 8 armature of relay 946, No. 10 armature and front contact of relay 900, conductor 994, conductor 995, contacts 996, conductor 832 to ground. Relay 844 operates in parallel with relay 855 over a circuit which includes the right normal continuity contacts of relay 844 and the armature and back contact of relay 888. Relay 844 locks to ground on the sleeve lead 997 of the selector connector 998 and closes the tip and ring leads 750 and 751 of the tie trunk to corresponding leads of the selector connector. Relay 855 functions to clear the tie trunk TL tip and ring leads 750 and 751 and to connect the tip and ring leads of the selector connector to the attendant's circuit TC for dial pulsing. The dial pulses then direct the selector connector to the desired extension, such as station No. 25, in well-known manner.

When the connection to the selector connector 998 is completed, relay 772 operates to the position shown whereupon relay 773 operates in a circuit which includes negative battery, resistor 774, the middle right armature and front contact of relay 844, the winding of relay 773, the No. 1 armature and front contact of relay 889, right contact and armature of relay 772 and ground. Relay 773, operated, locks independently of relay 889.

With relay 773 operated, the lamp 864 associated with the tie trunk key TL2 flashes as a 120 IPM rate in a circuit which includes the interrupter 775, front contact and inner left armature of relay 773, conductor 866, filament of lamp 864, conductor 808, contacts 807 of key 805 and ground. This flashing of lamp 864 continues while the ringer at the called station is being rung, it being understood that ringing current is applied to the called extension line under control of the selector connector 998 in well-known manner.

When the called stations answers, relay 772 operates, releasing relay 773 which removes the 120 IPM signal.

*Disconnection*

When the telephone at the called station is restored to its support relay 772 releases removing ground from conductor 897 and thereby causing the release of relay 891. The release of relay 891 increases the resistance through the windings of relay 845 towards the distant P.B.X which serves to give the distant end a disconnect signal. When the distant P.B.X disconnects, relay 845 releases causing relay 991 to release and to remove the holding bridge including the coil 858 from the trunk conductors and thereby release the selector connector 998.

What is claimed is:

1. In a telephone system, telephone lines, central office trunk circuits, an attendant's position, a switchboard at said position, means comprising an illuminatable nonlocking key button identifying each of said lines and trunk circuits at said switchboard, means responsive to the seizure of one of said trunk lines at a central office for illuminating the key button corresponding to the seized trunk circuit in a distinctive manner, a station-finder switch, means responsive to a momentary operation of a key button corresponding to one of said telephone lines for directing said switch to the line identified by the momentarily operated key button and for signaling the corresponding line, whereby said seized trunk circuit is connected to said signaled telephone line, other means also responsive to the momentary operation of said last said key button for illuminating the key button corresponding to the said seized trunk in a second distinctive manner, means effective incident to the response of the signaled telephone line for illuminating the key button corresponding to the said seized trunk in a third distinctive manner and for illuminating the key button corresponding to the signaled telephone line in a distinctive manner.

2. In a telephone system, extension lines, central office trunk circuits, an attendant's position, a switchboard at said position, means comprising an illuminatable key button identifying each of said extension lines and said central office trunk circuits at said switchboards, a pair of station-finder switches, means responsive to the seizure of one of said trunk lines at a central office for illuminating the key button corresponding to the seized trunk circuit, means responsive to the momentary operation of the key button corresponding to the seized trunk circuit followed by the momentary operation of a key button corresponding to one of said extension lines for extending the seized trunk circuit to the said extension line and for signaling the said extension line by way of one of said station-finder switches, and means responsive to the operation of only the key button corresponding to the said one of said extension lines for signaling the said extension line by way of the other of said station-finder switches.

3. In a telephone system, trunk circuits, extension stations, an attendant's position, an attendant's telephone thereat, a switchboard at said position including a trunk key for each of said trunk circuits and an extension key for each of said extension stations, an illuminatable manually operable button associated with each of said keys, means for illuminating said key buttons individually, means responsive to a call incoming to said switchboard by way of one of said trunk circuits for operating the the illuminating means of the button associated with the corresponding trunk key in a distinctive manner, means responsive to a momentary operation of the illuminated key button for connecting the attendant's telephone with the said one of said trunk circuits, automatic switching means comprising a two-motion stepping switch, means responsive to a momentary operation of the button associated with one of said extension keys for operating said stepping switch to extend the said one of said trunk circuits to the extension station corresponding to the momentarily operated extension key button and for signaling said extension station, and means controlled from said extension station for operating the illuminating means of the said trunk key button in a different distinctive manner and for operating the illuminating means of the said extension key button in a distinctive manner.

4. In a telephone system, a central office trunk circuit, an extension station, an attendant's position, an attendant's telephone including an audible signaling device, a key at the attendant's position for said trunk circuit, a key at the attendant's position for said extension station, separate means for illuminating each of said keys, means responsive to the seizure of said trunk circuit at the central office for operating the illuminating means of the said trunk key and for simultaneously operating said audible signal device in a distinctive manner, means at the attendant's position for silencing said audible signal, means responsive to the operation of said trunk key for altering the illuminated condition thereof and for connecting said attendant's telephone to said trunk circuit, switching means including a two-motion stepping switch, and means responsive to a momentary operation of said station extension key for extending said trunk circuit to said extension station by way of said switch, for again altering the illuminated condition of said trunk key and for operating the illuminating means for said extension station key in a distinctive manner.

5. In a telephone system, an attendant's position, a plurality of extension stations, a two-motion stepping switch, a manually operable key for each of said extension stations at said attendant's position, each of said keys having an illuminatable key button, a source of signaling current, means responsive to a momentary operation of one of said keys for operating said stepping switch to complete a telephone connection between said attendant's position and the extension station corresponding to the momentarily operated key and for operating the illuminating means of the said key to illuminate said key, means responsive to the completion of said connection for automatically connecting said source of signaling current to the said extension station, and means controlled from the said extension station for altering the illuminated condition of the said key.

6. In a telephone system, a trunk circuit, an extension station, a switchboard including trunk keys and extension station keys, means responsive to a call incoming to said switchboard by way of said trunk circuit for illuminating a corresponding trunk key in a distinctive manner, means responsive to a momentary operation of the illuminated trunk key for altering the character of the illuminated condition thereof, means responsive to the momentary operation of an extension station key for illuminating the extension station key in a distinctive manner, for again altering the illuminated condition of said trunk key, and for extending said trunk circuit to and automatically signaling the extension station corresponding to the momentarily actuated extension station key, means controlled from the said extension station in responding to the automatic signaling thereof for again altering the illuminated condition of said trunk key, and other means controlled from said extension station for altering the illuminated condition of both said trunk and extension station keys.

No references cited.